United States Patent [19]
Hieda

[11] Patent Number: 4,814,861
[45] Date of Patent: Mar. 21, 1989

[54] SIGNAL PROCESSING APPARATUS WITH INDEPENDENT GAIN CONTROL FOR CHROMINANCE AND COLOR SIGNALS

[75] Inventor: Teruo Hieda, Yokohama, Japan

[73] Assignee: Canon Kabushiki Kaisha, Tokyo, Japan

[21] Appl. No.: 883,053

[22] Filed: Jul. 8, 1986

[30] Foreign Application Priority Data

Jul. 10, 1985 [JP] Japan .................................. 60-151791
Jul. 10, 1985 [JP] Japan .................................. 60-151792
Jul. 10, 1985 [JP] Japan .................................. 60-151793
Jul. 10, 1985 [JP] Japan .................................. 60-151794

[51] Int. Cl.⁴ .............................................. H04N 9/73
[52] U.S. Cl. .......................................... 358/29; 358/27
[58] Field of Search .................. 358/15, 16, 29 C, 27, 358/28, 12, 11, 138, 174, 21 R, 80, 14, 44

[56] References Cited

U.S. PATENT DOCUMENTS 2,951,903 9/1960 de Vrijer ............................ 358/15 X
3,636,244 1/1972 Smierciak et al. ..................... 358/17
4,338,625 7/1982 Yamanaka .......................... 358/29 C

FOREIGN PATENT DOCUMENTS

0053191 3/1982 Japan ................................. 358/29 C

Primary Examiner—Howard W. Britton
Assistant Examiner—Victor R. Kostak
Attorney, Agent, or Firm—Fitzpatrick, Cella, Harper & Scinto

[57] ABSTRACT

A signal processing apparatus comprising: first automatic gain controls for automatically controlling gains of a plurality of chrominance signals and outputting the result to a process circuit; circuitry for dot-sequencing the chrominance signals before the first automatic gain controls; and second automatic gain controls for automatically controlling the gain of signals which had been dot-sequenced, wherein a video signal is obtained from the outputs of the first and second automatic gain controls. An image pickup apparatus for use in this signal processing apparatus is also provided.

41 Claims, 9 Drawing Sheets

SIGNAL PROCESSING APPARATUS WITH INDEPENDENT GAIN CONTROL FOR CHROMINANCE AND COLOR SIGNALS

BACKGROUND OF THE INVENTION

1. Field of the Invention

The present invention relates to a signal processing apparatus and an image pickup apparatus using an image pickup device and, more particularly, to a signal processing apparatus for reducing a foldover distortion and an image pickup apparatus provided with this signal processing apparatus.

2. Related Background Art

A conventional example will now be described with respect to an image pickup apparatus using an image pickup device of the CCD type shown in FIG. 10.

Figure 10:
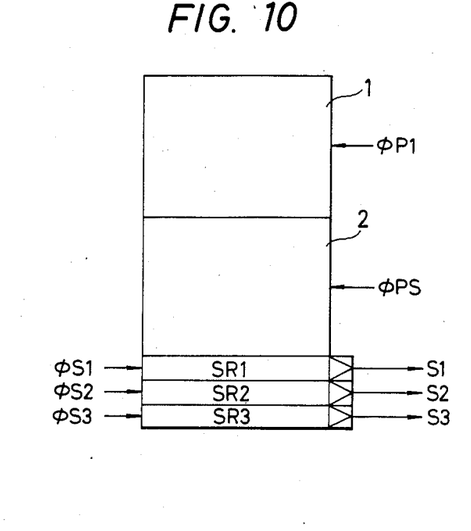
FIG. 10 is a diagram showing an example of an arrangement of an image pickup device.
Figure 11:
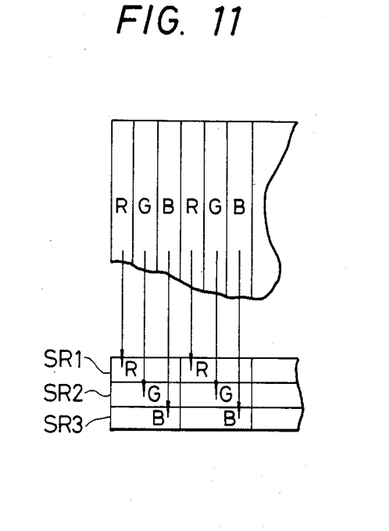
FIG. 11 is a diagram showing the relation among the color filter and the horizontal registers.

The image pickup device of FIG. 10 is a frame transfer type CCD. First, the information charges which were photoelectrically converted by an image pickup section 1 in correspondence to each color filter of a stripe filter are transferred at a high speed to a memory section 2 by drive pulses $\phi PI$ and $\phi PS$ for a vertical blanking period synchronized with a television. The information charges accumulated in the memory section 2 are transferred in a manner such that the information corresponding to each stripe filter is distributed and transferred to horizontal shift registers $SR_1$, $SR_2$, and $SR_3$ each time the information of one horizontal line is vertically transferred. Namely, as shown in FIG. 11, in the conventional example, the information of one horizontal line of the memory section 2 is distributed to shift registers $SR_1$ to $SR_3$ for every color information, respectively. R, G, and B signals are output from the horizontal shift registers $SR_1$, $SR_2$, $SR_3$, respectively. Therefore, the registers $SR_1$ to $SR_3$ constitute separating means for separating the chrominance signals.

Figure 12:
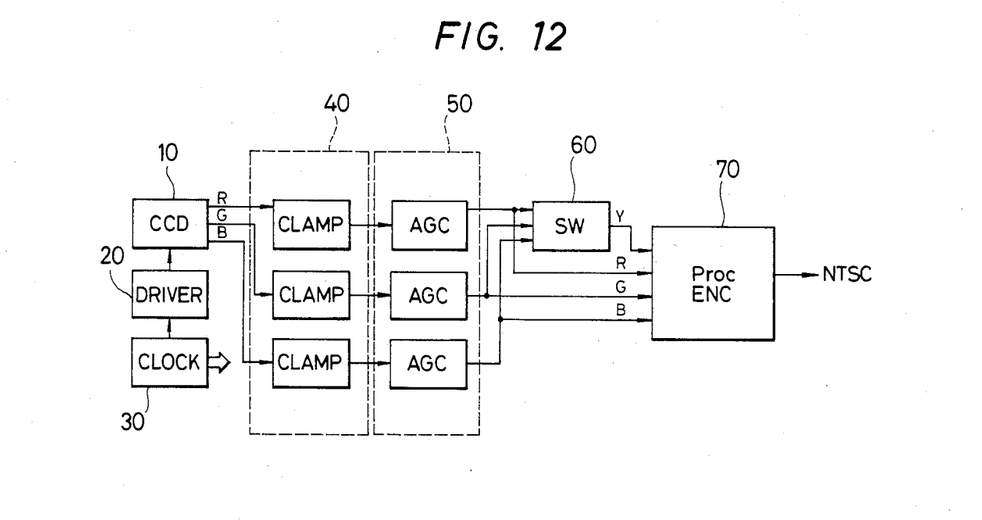
FIG. 12 is a diagram showing an arrangement of a conventional image pickup apparatus.

FIG. 12 is a block diagram of a signal processing circuit of the signals read out of the CCD. A color filter as shown in, e.g., FIG. 11 is attached to the surface of an image pickup device 10 (e.g., CCD) driven by a clock IC 30 and a driver 20. The R, G, and B signals corresponding to the color separation filters are individually obtained as output signals of the device 10. These signals are reproduced as direct currents by a clamp circuit 40 and then supplied to an automatic gain control circuit (hereinafter, abbreviated to "AGC circuit") 50 at the next stage, thereby setting the R, G, and B signals to the same level. As a clamp circuit, it is further desirable to use a feedback clamp circuit to feed back a DC potential of an input signal of a switch circuit 60 to the clamper. Output signals of the AGC circuit 50 are then supplied to the switch circuit 60 serving as sequencing means for forming a luminance signal at the next stage and to a process encoder 70 including circuit for performing ordinary signal processes such as gamma correction, white clip, and the like and converting the output signals to the NTSC signals. The operation of the switch circuit 60 will now be described with reference to FIG. 13. In the diagram, $S_1$, $S_2$, and $S_3$ denote output signals of the CCD in FIG. 10. In this example, it is assumed that the drive pulses of the horizontal shift registers are three-phase drive pulses which are equivalent to the signal waveforms shown in FIG. 13.

Figure 13:
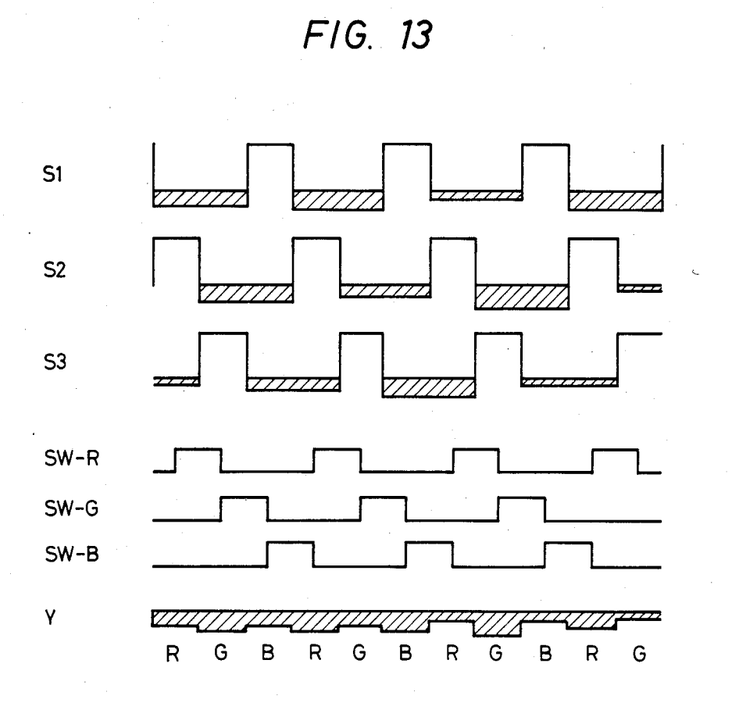
FIG. 13 is an explanatory diagram of a method of forming a luminance signal.

The signals $S_1$ to $S_3$ are taken out by switch pulses of control signals SW-R, SW-G, and SW-B of the switch circuit. The signals taken out are added, so that a luminance signal shown at Y in the diagram is derived. Namely, the same signal Y as the spatial sampling of the color separation filters is obtained, so that the resolution is fairly improved. In this manner, when only the portions necessary as a luminance signal are taken out by means of the switching and added and the luminance signal is generated, no noise will be added and the S/N ratio will not be deteriorated.

In the foregoing conventional example, as shown in FIG. 10, the delay characteristic and frequency characteristic in the clamp circuit 40 and AGC circuit 50 are extremely important for the output signals $S_1$ to $S_3$ of three systems of the CCD.

In other words, according to the experiments, the delay time must be set to a time within ±20 nsec and the cut-off frequency must be set to a frequency above 10 MHz.

However, those AFC circuits generally have the drawback that the delay characteristic and frequency characteristic are extremely bad.

Thus, this drawback causes another drawback, that the MTF characteristic deteriorates and the resolution decreases.

On the contrary, there is also the drawback that in order to improve the delay characteristic and frequency characteristic of the AGC circuit, circuit current must be considerably increased and a complicated IC circuit must be constructed using special IC processes.

On the other hand, there is also the problem that in the case where the AGC circuit is provided in the processing circuit, e.g., after the gamma correction circuit, the fluctuation of the DC component which is produced by the AGC circuit will cause a clip level error in the white clip or dark clip.

SUMMARY OF THE INVENTION

It is the first object of the present invention to solve the foregoing drawbacks in the conventional technology.

A second object of the invention is to provide an AGC circuit having good delay characteristic and good frequency characteristic.

Another object of the invention is to provide a proper arrangement of AGC circuits.

According to a preferred embodiment of the invention to accomplish the above objects, in a signal processing circuit to obtain a luminance signal Y by dot-sequencing respective R, G, and B chrominance signals, automatic gain control means for respectively automatically controlling the gains of those plurality of chrominance signals are provided, and there are disclosed means for forming the luminance signal by dot-sequencing the chrominance signals before their gains are automatically controlled, and an image pickup apparatus for processing the plurality of chrominance signals derived through the automatic gain control means and an output of the luminance signal forming means.

The fourth object of the invention is to provide an image pickup apparatus which can obtain the good characteristics by a simple constitution in a signal processing circuit for obtaining the luminance signal Y by dot-sequencing the respective chrominance signals.

According to another preferred embodiment of the invention to accomplish the above object, there are disclosed luminance signal forming means for forming a luminance signal by dot-sequencing a plurality of chrominance signals, and an image pickup apparatus which can obtain the good frequency characteristic by a simple construction by switching the gains of the chrominance signals which are input to the luminance signal forming means at a plurality of stages.

The above and other objects and features of the present invention will become apparent from the following detailed description and the appended claims read with reference to the accompanying drawings.

BRIEF DESCRIPTION OF THE INVENTION

DESCRIPTION OF THE PREFERRED EMBODIMENT

Figure 1:
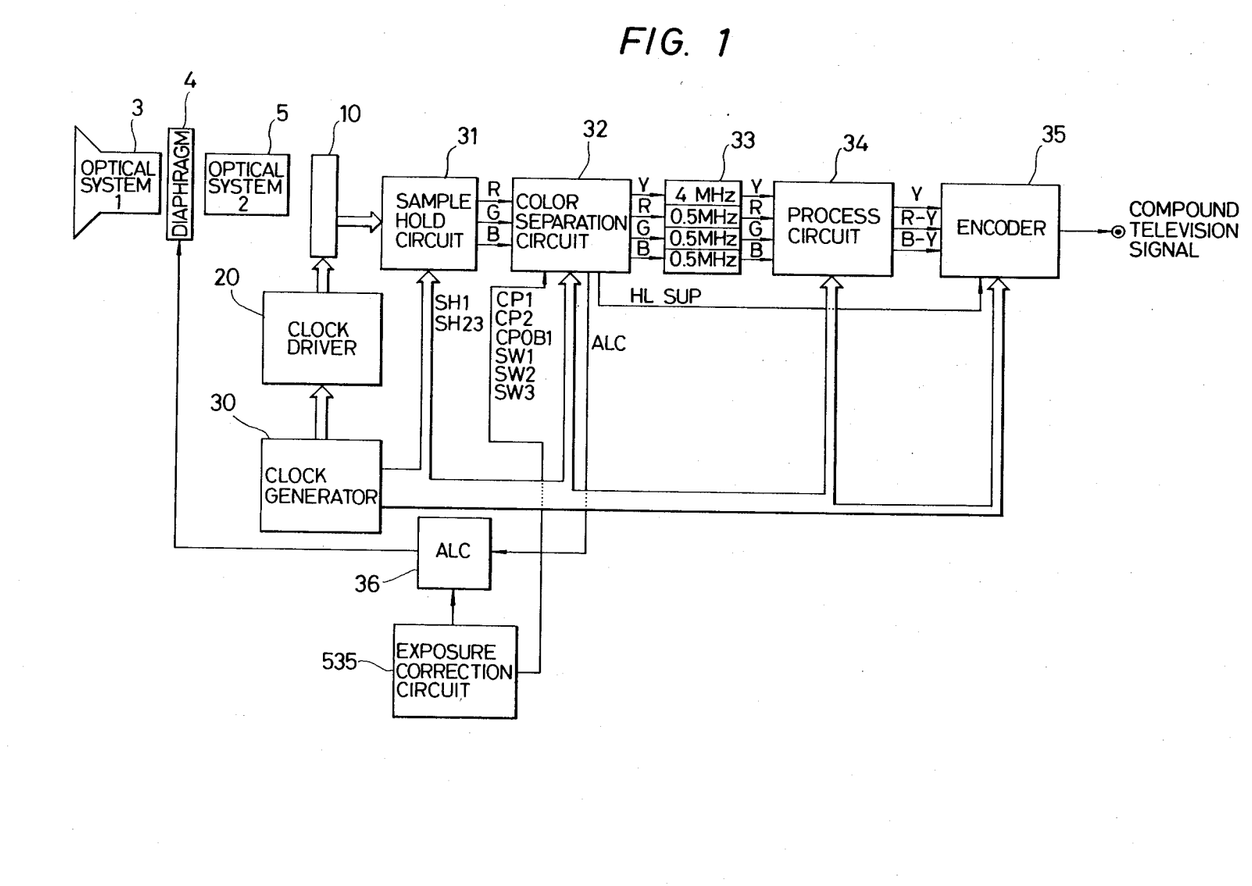
FIG. 1 is a diagram showing an example of an arrangement of an image pickup apparatus of the present invention.

The present invention will now be described hereinbelow with respect to the preferred embodiment. FIG. 1 is a diagram showing an example of an arrangement of an image pickup apparatus of the present invention.

In the diagram, reference numeral 3 denotes a first optical system; 4 is a diaphragm; 5 a second optical system; 10 the frame transfer type CCD serving as image pickup means shown in FIG. 10; 20 the clock driver; 30 the clock generator; and 31 a sample hold circuit for increasing the duty ratios of the signal components of the respective outputs of the horizontal shift registers $SR_1$, $SR_2$, and $SR_3$.

Numeral 32 denotes a color separation circuit as a signal processing apparatus according to the present invention. This color separation circuit controls the gains of the respective chrominance signals and forms a high frequency luminance signal (Y signal).

A low pass filter (LPF) 33 allows the component below 4 MHz to pass for the Y signal and allows the components below 0.5 MHz to pass for the R, G, and B signal.

A process circuit 34 as processing means executes various kinds of corrections such as, for example, clamp, γ correction, white clip, and the like and also forms color difference signals (R-Y) and (B-Y).

An encoder 35 modulates the respective signals Y, (R-Y), and (B-Y) and multiplexes them. Outputs of the color separation circuit 32 are supplied to an ALC circuit 36 (automatic diaphragm controlling circuit) and servo controlled such that an amount of light which enters the CCD 10 will lie within the dynamic range of the CCD.

Figure 2:
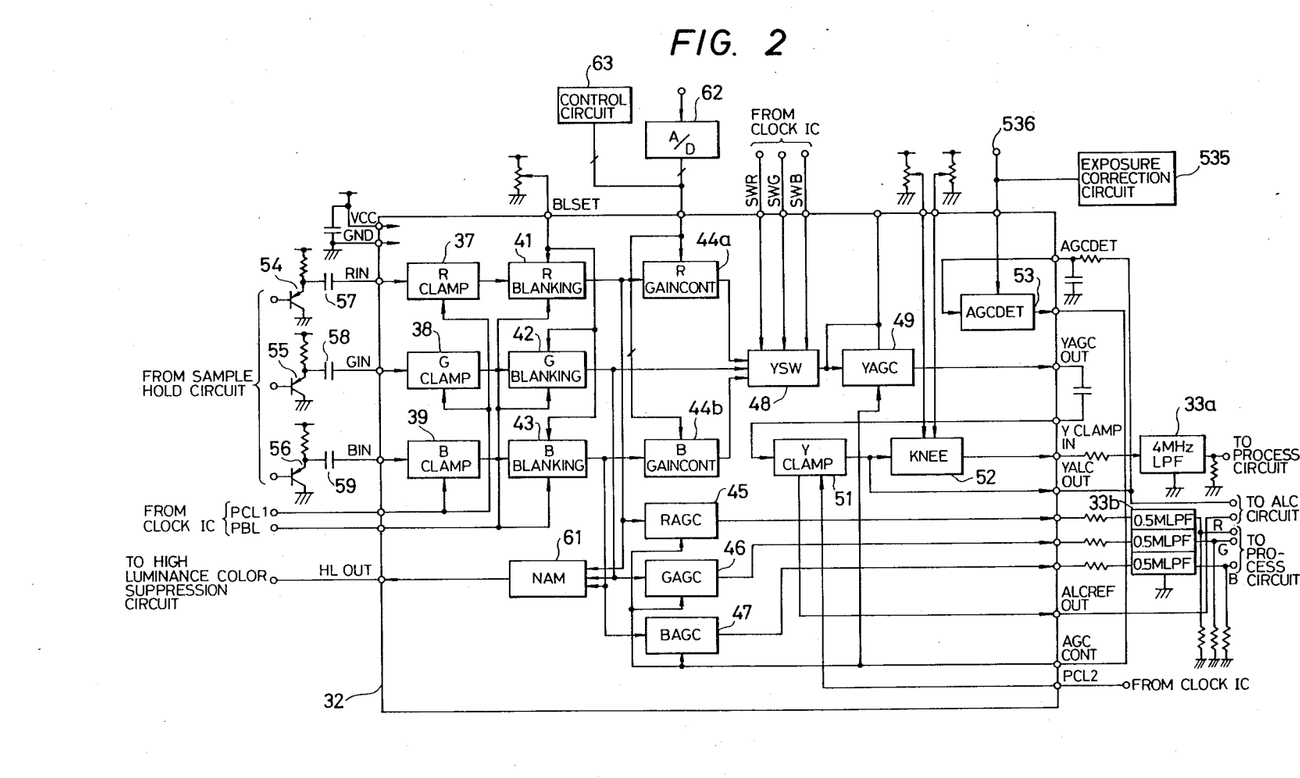
FIG. 2 is a diagram showing an example of an arrangement of a color separation circuit shown in FIG. 1.

FIG. 2 is diagram showing an example of an arrangement of the color separation circuit 32 of the embodiment.

Reference numerals 54 to 56 denote transistors to input the R, G, and B signals, respectively; 57 to 59 are clamp capacitors; 37 to 39 clamp circuits; 41 to 43 blanking circuits to mute the signals for the blanking periods, respectively; 44a and 44b gain control circuits as first gain control means; and 45 to 47 AGC circuits as color system automatic gain control means for automatically controlling the gains of the R, G, and B signals, respectively. A switch circuit 48 as luminance signal forming means forms a dot-sequenced luminance signal by respectively switching the gain-controlled R, G, and B signals in accordance with the arrangement of the color filters. An AGC circuit 49 as luminance system automatic gain control means automatically controls the output gain of the Y signal. Numeral 51 denotes a clamp circuit for clamping the Y signal; 52 a KNEE circuit as nonlinear converting means for performing the nonlinear conversion such as level compression and the like; 53 a detection circuit for controlling the gains of the AGC circuits 45 to 47 and 49; 33a an LPF of 4 MHz; and 33b and LPF of 0.5 MHz.

An NAM circuit 61 nonarithmetically adds the outputs of the blanking circuits 41 to 43 and is a maximum value circuit for outputting the maximum value among the input values. An output of the NAM circuit 61 is input to a high luminance suppression circuit in the process circuit 34. When at least one of the R, G, and B signals is saturated, the chrominance signals are suppressed.

An A/D converter 62 converts an analog control voltage which is input from the outside to a digital signal and outputs, thereby controlling the R gain controller 44a and B gain controller 44b by this digital signal.

With the foregoing construction, an arrangement of each gain controller is simplified and the drive current of the circuit is reduced.

A control circuit 63 outputs a digital signal.

An output of the control circuit 63 and an output of the A/D converter 62 are connected by a wired OR circuit and this point will be explained hereinafter.

In this embodiment, the AGC circuits 45 to 47 of the R, G, and B signals are provided separately from the Y system.

Therefore, as the characteristics of those AGC circuit, it will be sufficient if predetermined characteristics of about a color band (e.g., 1 MHz) are obtained and there is an effect such that there is no need to obtain predetermined characteristics of a luminance signal band. Therefore, the sections of the AGC circuit 45 to 47 do not need to cope with a wide band, so that the circuits can be simplified and will not result in complication of the manufacturing processes when these circuits are realized as an IC.

Also, the drive current of the circuit can be reduced.

On the other hand, since the characteristics of the AGC circuit 49 of the Y system and the characteristics of the AGC circuits 45 to 47 of the R, G, and B systems can be properly independently set, for example, the functions for automatic color suppression and the like in the case of a low luminance can be provided by those AGC circuits.

Since the AGC circuits are provided in the color separation circuit before the process circuit, even if there are variations in levels of the inputs as well, these levels are controlled to a constant value by the AGC circuits. Thus, even if there are changes in gains by the AGC circuits as well, the characteristics of the gamma correction, white clip, dark clip, and the like by the process circuit will not change.

Further, since variations in DC levels which are caused due to the AGC circuits are canceled by the clamp circuits arranged at the first stage of the process circuit, in the case where the AGC circuits are provided before the process circuit as in this embodiment, there is also the merit such that the allowable values of the variations in the DC levels due to the AGC circuit increase.

On the other hand, in the case where the AGC circuits are arranged before the clamp circuits in the process circuit and the process circuit together with the AGC circuits is constituted as an IC, the LPFs, particularly, the capacitors constituting the LPFs must be externally attached to the IC. Thus, there is the drawback that the number of pins of the IC will increase by two for each of the channels Y, R, G, and B respectively. However, since the AGC circuits for the chrominance signals are included in the color separation IC before the process IC to thereby form an IC as in the embodiment, it is sufficient to arrange the LPFs so as to connect the process IC and the color separation IC. Therefore, it is possible to solve the foregoing drawback that the number of pins of the IC increase by two for every channel Y, R, G, and B.

This point is also one feature of the embodiment.

In the embodiment, since the AGC circuits for the chrominance signals are included in other systems different from the switch circuit 48, the deteriorations of the frequency characteristics in the AGC circuits 45 to 47 will not adversely influence the high band luminance signal which is formed by the switch circuit 48.

In addition, according to the embodiment, after the Y signal was synthesized due to the switching, the AGC circuit 49 for the Y signal is provided before the KNEE circuit. Therefore, it is sufficient for the AGC circuit 49 to have the characteristics of the Y band (e.g., 6 MHz), so that the current of the AGC circuit can be suppressed to a low level and the AGC circuit can be also fairly easily formed as an IC. Since the clamp circuit is provided after the AGC circuit 49 and then the KNEE circuit is arranged, even if the gain of the AGC circuit varies and this causes a DC fluctuation as well, the KNEE characteristic will be hardly influenced.

Namely, since the allowable value of the variation in DC level due to the AGC circuit increases, there is the effect such that the foldover point of the characteristic curve (polygonal curve) of the KNEE circuit becomes stable.

Figure 3:
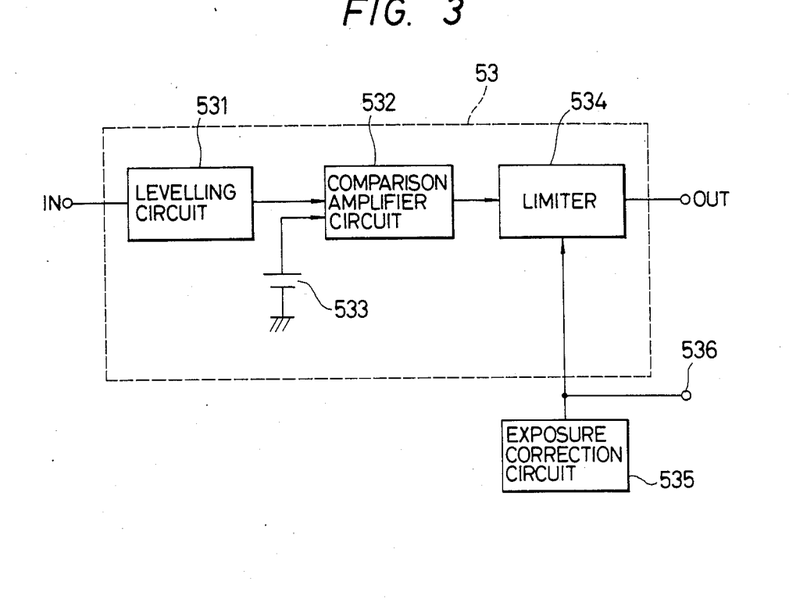
FIG. 3 is a diagram showing an example of an arrangement of a detection circuit 53 shown in FIG. 2.

FIG. 3 is a diagram showing an example of an arrangement of the detection circuit 53 in the embodiment. This detection circuit comprises: a leveling circuit 531; a comparison amplifier circuit 532; a reference power source 533; and a variable limiter 534.

The input video signal is leveled by the leveling circuit 531 and the leveled signal is compared with a reference level. The gains of the AGC circuits 45 to 47 and 49 are controlled in accordance with a comparison output such that the comparison output becomes zero. When the comparison output reaches a predetermined upper limit, the limiter 534 allows the comparison output to be saturated, thereby enabling the gain control range to be variable controlled by means of an exposure correction circuit 535.

The exposure correction circuit functions so as to narrow the variable gain range of the AGC circuit upon exposure correction and manual diaphragm setting.

Thus, even if a diaphragm value is corrected upon such exposure correction and manual diaphragm setting as well, the reverse correction will not be performed by the AGC circuit and the exposure correcting effect will be improved.

Moreover, as compared with the case where the gains of the AGC circuits are completely fixed, the variable gain ranges of the AGC circuits are set to narrow ranges in the embodiment. Therefore, the feeling of physical disorder which occurred conventionally when the control state was returned from the exposure correction state to the normal diaphragm control state due to the ALC, if fully eliminated.

On the other hand, not only is the variable gain range of the limiter 534 controlled by the exposure correction circuit 535 as described, it also can be controlled due to the input from a terminal 536. Therefore, the gain characteristic of the whole color separation process circuit can be controlled by the terminal 536 as well.

Since the AGC circuit 49 of the Y system and the AGC circuits 45 to 47 of the respective color systems are separately constituted, the preferred embodiment has the following feature. Namely, not only the proper AGC circuit can be used for each signal band but also the variable gain ranges as one of the characteristics of the AGC circuit 49 of the Y system and of the AGC circuits 45 to 47 of the respective color systems are interlockingly controlled by the output of the detection circuit 53.

With such a construction, a variation in upper limit gain of each AGC circuit can be eliminated and the generation of false chrominance signals can be suppressed.

Figure 4A:
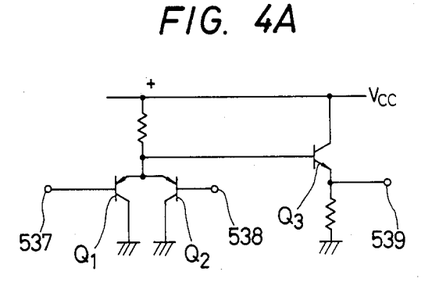
FIG. 4A is a diagram showing an example of an arrangement of a limiter circuit shown in FIG. 3.

FIG. 4A is a diagram showing an example of an arrangement of the limiter 534, in which $Q_1$ to $Q_3$ denote transistors.

Reference numeral 537 denotes a signal input terminal, 538 is a limit value control input terminal, and 539 is a signal output terminal.

Figure 4B:
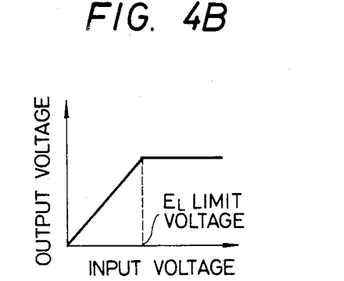
FIG. 4B is a diagram showing the characteristics of the limiter circuit.

FIG. 4B is a diagram showing the characteristic of the output voltage to the input voltage. As will be understood from this graph, the voltage which is output from the output terminal 539 changes almost linearly in accordance with the voltage which was input to the input terminal 537; however, when the input voltage increases than the level of the voltage input to the terminal 538; the output voltage of the terminal 539 is saturated.

Figure 5:
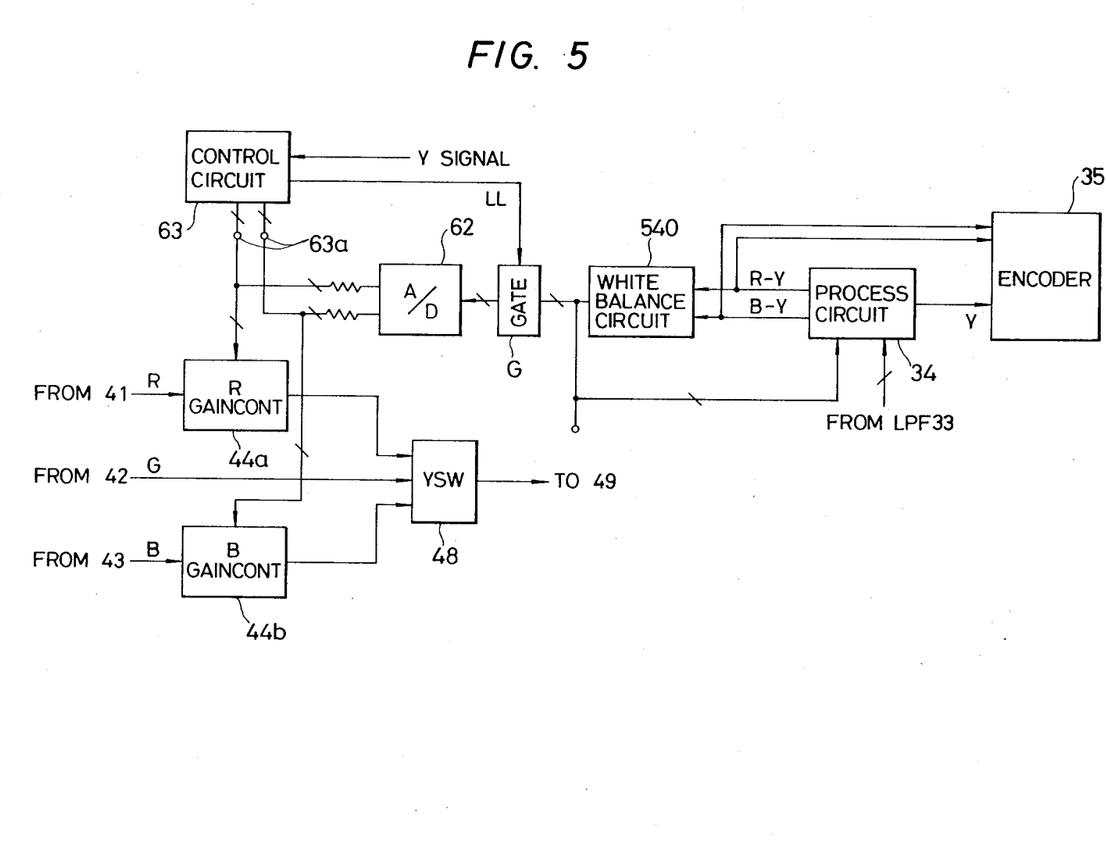
FIG. 5 is a diagram showing an arrangement to control the white balance.

FIG. 5 is a diagram showing an arrangement to control the gains of the gain controllers 44a and 44b. In the embodiment, the gains of these controllers are controlled by the digital signals. The signal corresponding to the difference signal between a reference value and a mean value of the color difference signals of R-Y and B-Y of the process circuit 34 is output from a white balance circuit 540 as white balance control means. The analog control signal is updated only when a white balance setting switch (not shown) is turned on in the case of picking up an image of a white object, and when this switch is turned off, the gain controllers 44a and 44b hold the just preceding values until this switch is next turned on so as to reduce the foregoing difference signal.

As such a white balance circuit, there has been known the circuit disclosed in, e.g., Japanese Patent Examined Publication No. 14369/1973 (corresponding to U.S. Pat. No. Re 28774, reissued on Apr. 13, 1976) and the like. The output of the white balance circuit also controls the gains of the R and B channels in the process circuit.

The A/D converter 62 converts the analog output of the white balance circuit 540 to the digital signal and sets the gain ratio of the R, G, and B channels to a predetermined value. With such a constitution, the gain-controlled R, G, and B signals are the signals according to the correct color temperatures, so that the high band Y signal with less moire can be formed even for an object near achromatic color.

Hitherto, as a gain controller, the gain has been varied by an analog control signal. However, to form the high band Y signal as in the preferred embodiment, the use of the conventional analog type gain controllers as the gain controllers 44a and 44b causes the drive currents to be increased in order to improve the delay characteristic and frequency characteristic. Further, the special IC manufacturing processes must be used.

Therefore, in the embodiment, the gain controllers at the front state of the switch circuit 48 are controlled by the digital control inputs of two bits in a stepwise manner, thereby discontinuously controlling the gain. Therefore, the circuit construction is extremely simplified and the drive current is also fairly reduced.

In the embodiment, on the other hand, not only the input terminals of the control signals of the gain controllers 44a and 44b are connected to the outputs of the A/D converter 62 but also they are connected to external terminals 63a due to the wired OR connection. Thus, by connecting a bias capacitor to the external terminals 63a, the switching noise of the output of the A/D converter can be removed.

As shown in FIG. 5, it is also possible to connect the control circuit 63 and thereby to control the gain controllers 44a and 44b by the control circuit 63.

The control circuit 63 receives the Y signal and detects the mean level and outputs a low illuminance detection signal LL when the mean level is below a predetermined value. Due to this, the gate provided between the white balance circuit and the A/D converter is closed to disconnect the input to the A/D converter.

At this time, the gain of the gain controller 44a increases, while the gain of the gain controller 44b relatively decreases.

Thus, the CCD 10 has the characteristics such that the sensitivity regarding R is high and the sensitivity with respect to B is low. Therefore, in the case of a low illuminance, the gain of the gain controller 44b for amplifying B having a low S/N ratio is relatively reduced, while the gain of the gain controller 44a for amplifying R having a high S/N ratoio is comparatively increased, thereby improving the S/N ratio as a whole when the illuminance is low.

Consequently, in the case of a dark object, it is possible to obtain a high quality image in which the S/N ratio has been preferentially improved relative to moire or the like.

Figure 6:
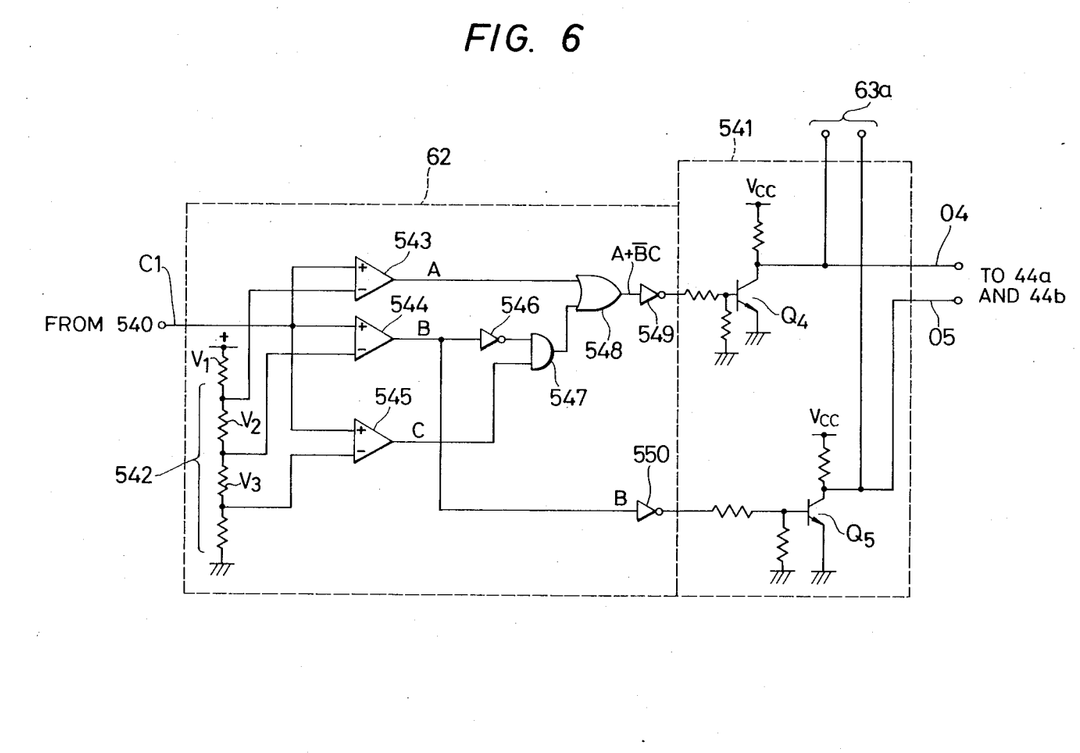
FIG. 6 is a diagram showing an arrangement of an A/D converter shown in FIG. 5 and its peripheral circuits.

FIG. 6 is a diagram showing an example of an arrangement of the A/D converter 62 and a wired OR section 541 (not shown in FIG. 5).

Reference numerals 543 to 545 denote comparators. A control input CI from the white balance circuit 540 is compared with reference values $V_1$ to $V_3$ of a reference power source 542 by the comparators 543 to 545, respectively. In this case, there is the relation of $V_1 > V_2 > V_3$.

Numerals 546, 549, and 550 denote inverters; 547 is an AND gate; 548 an OR gate; and $Q_4$ and $Q_5$ transistors. With this arrangement, the levels of outputs 04 and 05 for the level of the control input CI become as follows.

| CI | A | B (Output of the line shown at 04) | C | A + B − C (Output of the line shown at 05) |
|---|---|---|---|---|
| $CI > V_1$ | 1 | 1 | 1 | 1 |
| $V_1 > CI > V_2$ | 0 | 1 | 1 | 0 |
| $V_2 > CI > V_3$ | 0 | 0 | 1 | 1 |
| $V_3 > CI$ | 0 | 0 | 0 | 0 |

Therefore, the outputs 04 and 05 change in accordance with the order of 11, 10, 01, and 00 as the level of CI decreases.

The gain controllers 44a and 44b switch the gains to four stages in accordance with the data of two bits, respectively.

As described above, although the frequency characteristics of the gain controllers 44a and 44b before the switch circuit 48 are important, there is no need to strictly set the balance of the gains.

Therefore, as in the embodiment, by use of the gain controllers with simple constitutions, the Y signal of substantially sufficiently high band can be easily obtained.

On the other hand, the accuracy of the white balance of the color signal system must be high; therefore, in the embodiment, it is performed in the process circuit separately from the white balance of the Y system.

Figure 7:
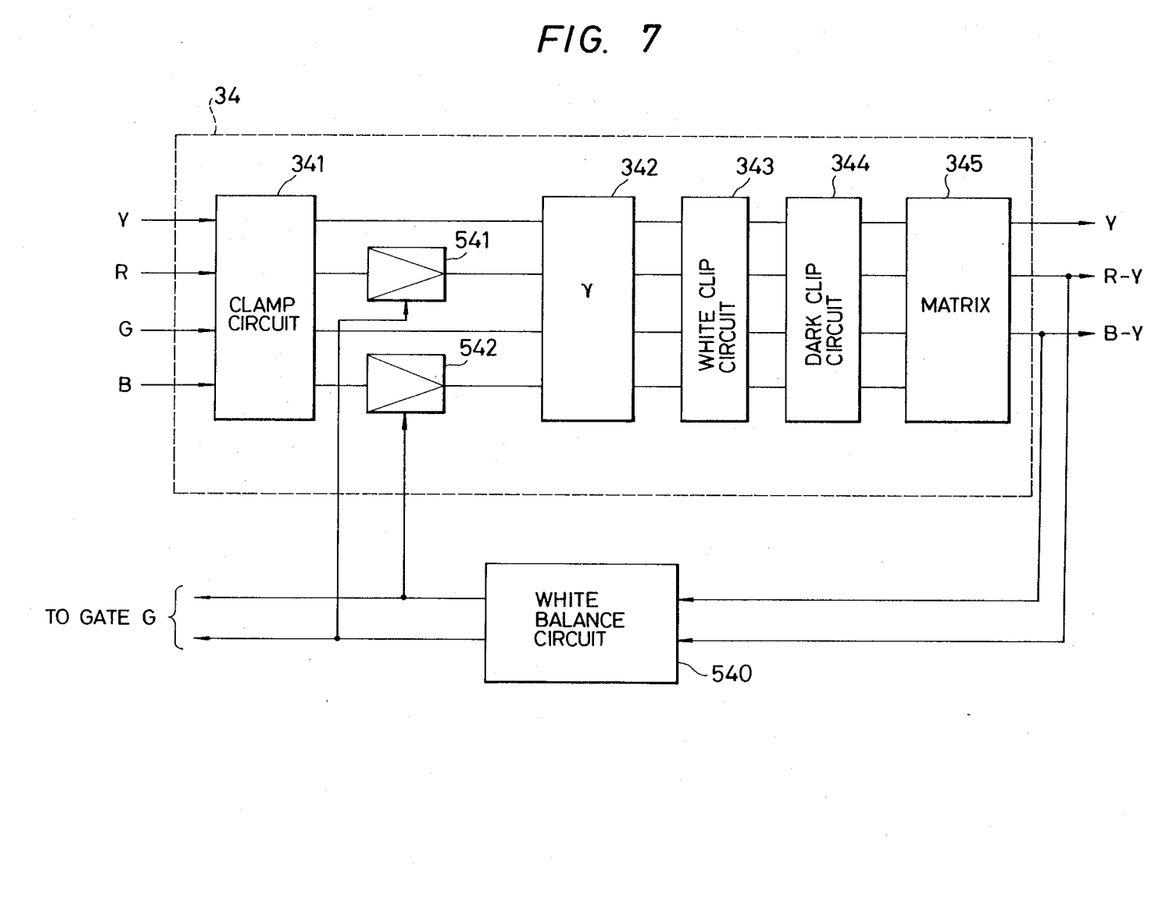
FIG. 7 is a diagram showing an example of an arrangement of a process circuit 34 shown in FIG. 1.

FIG. 7 is a diagram showing an arrangement of the process circuit 34 shown in FIGS. 1 and 5. In the diagram, a clamp circuit 341 clamps the DC levels of the input Y, R, G, and B signals to a reference level. A gamma correction circuit 342 executes a predetermined nonlinear conversion. A white clip circuit 343 clips the signal above a predetermined level. A dark clip circuit 344 clips the signal below a predetermined level. A matrix circuit 345 arithmetically operates the Y, R, G, and B signals to form the Y (R-Y), and (B-Y) signals.

Numerals 541 and 542 denote gain controllers as second gain control means for the chrominance signals. The gains are controlled by the output of the white balance circuit 540.

As mentioned above, the mean value of each of the (R-Y) and (B-Y) signals as the outputs of the white balance circuit 540 is compared with a predetermined reference value and the signal corresponding to the difference is output, respectively.

The gain controllers 541 and 542 operate such that the signal corresponding to the difference becomes zero, respectively.

Figure 8:
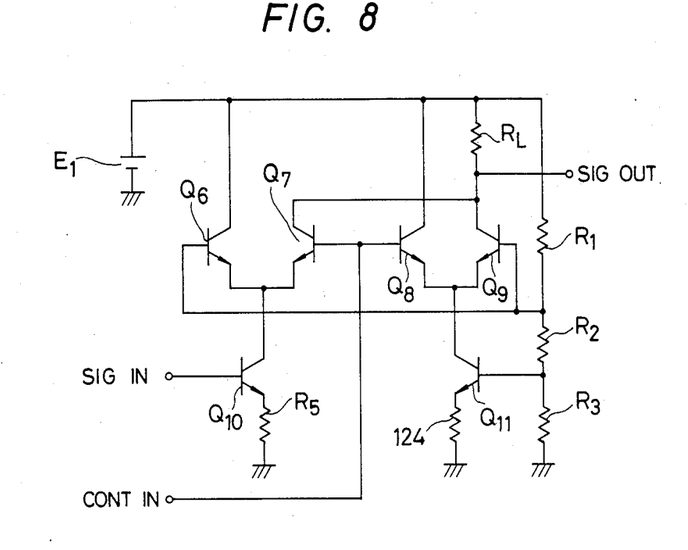
FIG. 8 is a diagram showing an example of an arrangement of gain control circuits 541 and 542 shown in FIG. 7.

FIG. 8 is a diagram showing an example of an arrangement of the gain controllers 541 and 542. $Q_6$ to $Q_{11}$ denote transistors; $R_1$ to $R_5$ and $R_L$ are resistors; $E_1$ a power source; $SIG_{IN}$ a signal input terminal; $SIG_{OUT}$ a signal output terminal; and $CONT_{IN}$ a control input terminal.

Assuming that the input signal of the terminal $SIG_{IN}$ is constant, $Q_{10}$ functions as a constant current source and the current corresponding to the sum of currents respectively flowing through $Q_6$ and $Q_7$ flows through $Q_{10}$.

Therefore, as the voltage of the terminal $CONT_{IN}$ increases, the current of $Q_7$ increases and the current of $Q_6$ contrarily decreases. With an increases in current of $Q_7$, the current flowing through $R_L$ increases and the gain is enlarged.

On the other hand, as the current of $Q_7$ increases, the current of $Q_8$ also increases.

Since the potential of the connecting point of $R_2$ and $R_3$ is constant, $Q_{11}$ functions as a constant current source.

Thus, the current of $Q_9$ decreases due to the increase in current of $Q_8$. Therefore, even in the case where the current of $Q_7$ increases as well, the DC level of the terminal $SIG_{OUT}$ is corrected so as to become constant.

With such a constitution, the gains can be extremely accurately controlled in accordance with the level of the signal of the terminal $CONT_{IN}$.

To improve the frequency characteristic, on the contrary, a large current must be allowed to flow, so that there is the drawback such that the IC manufacturing processes also become complicated.

Preferable gain controllers of the frequency characteristics will now be described with reference to FIG. 9.

Figure 9:
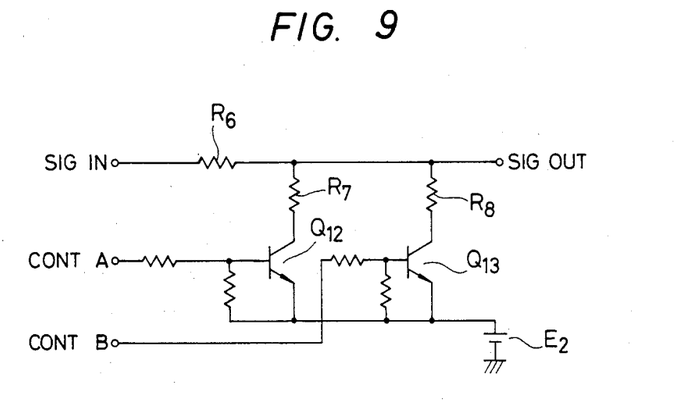
FIG. 9 is a diagram showing an example of an arrangement of gain control circuits 44a and 44b shown in FIG. 5.

FIG. 9 is a diagram showing an example of an arrangement of the gain controllers 44a and 44b. $R_6$ to $R_8$ denote resistors; $Q_{12}$ and $Q_{13}$ are transistors; and $CONT_A$ and $CONT_B$ are gain control input terminals. $R_7$ and $Q_{12}$, and $R_8$ and $Q_{13}$ constitute rudder connections of two stages.

In this case, there is the following relation among the inputs of the terminals $CONT_A$ and $CONT_B$ and the gains.

| $CONT_A$ | $CONT_B$ | GAIN |
|---|---|---|
| 0 | 0 | 1 |
| 0 | 1 | $\dfrac{R_8}{R_6 + R_8}$ |
| 1 | 0 | $\dfrac{R_7}{R_6 + R_7}$ |
| 1 | 1 | $\dfrac{X}{X + R_6} \left( \text{where } X = \dfrac{R_7 R_8}{R_7 + R_8} \right)$ |

With such a constitution, the gain controllers having sufficiently good frequency characteristics are derived. Although the rudder connections of two stages have been provided in the embodiment, the rudder connections of three stages may be also provided. However, in the case of rudder connections of four or more stages, the frequency characteristics will deteriorate due to an increase in stray capacitance of the switching transistor; therefore, this constitution is unfitted for the switching operation of the switch circuit 48.

Only four kinds of gain controls can be performed in the case of two stages, while only eight kinds of gain controls can be carried out in the case of three stages. However, since a high accuracy is not needed for the gain control when the luminance signal is formed, it has been confirmed that up to four or eight kinds of gain controls are sufficient in the practical use.

As described above, according to the present invention, since the luminance signal is obtained by dot-sequencing the chrominance signals derived without passing through any automatic gain controller, the luminance signal of the high band can be derived without being influenced by the deterioration of the frequency characteristic which is caused in the automatic gain control.

In addition, each chrominance signal is automatically gain controlled prior to the signal processes in the system different from the luminance signal system. Thus, the variation in DC level due to the automatic gain control is canceled by the clamping process which is first executed in the process circuit and no adverse influence will be exerted on the subsequent gamma correction and the like.

Further, since the automatic gain control of the color system is performed before execution of the signal processes, in the case of forming an IC of the signal processing apparatus, a low pass filter can be easily provided between the process circuit and the signal processing apparatus.

What is claimed is:

1. A signal processing apparatus comprising:
   (a) first automatic gain control means for automatically controlling gains of a plurality of color signals;
   (b) chroma signal forming means for forming chroma signals using color signals whose gains are automatically controlled by said first automatic gain control means;
   (c) high-band luminance signal forming means for dot sequencing said plurality of color signals whose gains are not controlled by said first automatic gain control means.

2. A signal processing apparatus according to claim 1, wherein said high-band luminance signal forming means is means for forming a luminance signal.

3. A signal processing apparatus according to claim 1, further comprising:
   (d) second automatic gain control means for automatically controlling a gain of a dot-sequenced signal formed by said high-band luminance signal forming means.

4. A signal processing apparatus according to claim 3, further comprising:
   control means for controlling the operations of said first and second automatic gain control means.

5. A signal processing apparatus according to claim 1, wherein said first automatic gain control means has a frequency characteristic suited for a chrominance signal band.

6. A signal processing apparatus according to claim 3, wherein said second automatic gain control means has a frequency characteristic suited for a luminance signal band.

7. A signal processing apparatus according to claim 4, wherein said control means comprises means for limiting gain control ranges of said first and second automatic gain control means.

8. A signal processing apparatus according to claim 7, wherein said control means sets the gains of said first and second automatic gain control means to the same value.

9. A signal processing apparatus according to claim 4, wherein said control means comprises means for detecting the level of said dot-sequenced, gain-controlled signal and controlling the gain of said first and second automatic gain control means such that said level becomes a predetermined level.

10. A signal processing apparatus according to claim 1, further comprising:
   means for controlling levels of color signals which have not yet been dot-sequenced by said high-band luminance signal forming means, using said plurality of color signals whose gains have been automatically controlled by said first automatically gain control means.

11. A signal processing apparatus according to claim 1, further comprising:
   (d) output means for controlling the levels of said plurality of color signals and outputting resulting level-controlled color signals to said high-band luminance signal forming means means.

12. A signal processing apparatus according to claim 11, wherein said output means is means for controlling the levels of the color signals in a stepwise manner.

13. A signal processing apparatus according to claim 11, further comprising:
   (e) means for controlling said output means such that a predetermined relation is obtained among the levels of said plurality of color signals.

14. A signal processing apparatus according to claim 13, wherein said control means includes:
   means for generating color difference signals from said chroma signals; and
   means for controlling said output means such that said color difference signals become predetermined levels.

15. An image pickup apparatus comprising:
   (a) image pickup means for generating a plurality of color signals;
   (b) first automatic gain control means for automatically controlling gains of said plurality of color signals generated from said image pickup means;
   (c) means for dot-sequencing the color signals whose gains are not controlled by said automatic gain control means;
   (d) second automatic gain control means for automatically controlling a gain of said dot-sequenced signals; and
   (e) processing means for processing the signals which were automatically gain controlled by said first and second automatic gain control means.

16. An image pickup apparatus according to claim 15, wherein said first automatic gain control means has a frequency characteristic suited for a chrominance signal band.

17. An image pickup apparatus according to claim 15, wherein said second automatic gain control means has a frequency characteristic suited for a luminance signal band.

18. An image pickup apparatus according to claim 15, wherein said dot-sequencing means is for forming a luminance signal.

19. An image pickup apparatus according to claim 18, further comprising:
   control means for controlling the operations of said first and second automatic gain control means.

20. An image pickup apparatus according to claim 19, wherein said control means comprises means for limiting gain control ranges of said first and second automatic gain control means.

21. An image pickup apparatus according to claim 19, wherein said control means comprises means for detecting the level of said dot-sequenced signals and controlling the gains of said first and second automatic gain control means such that said level becomes a predetermined level.

22. A signal processing apparatus comprising:
   (a) supplying means for supplying a plurality of color signals;
   (b) dot-sequencing means for generating a high-band luminance signal by dot-sequencing said plurality of color signals;
   (c) automatic gain control means for controlling a level of said high-band luminance signal so as to become a predetermined level; and
   (d) means for nonlinearly converting the signal which was controlled by said automatic gain control means.

23. A signal processing apparatus according to claim 22, further comprising:
   (e) clamp means for clamping said high-band luminance signal which was level-controlled by said automatic gain control means.

24. A signal processing apparatus according to claim 22, wherein said nonlinearly converting means comprises means for compressing the level of the signal which was controlled by said automatic gain control means.

25. A signal processing apparatus according to claim 22, wherein said supplying means comprises image pickup means for generating said plurality of color signals.

26. A signal processing apparatus according to claim 25, wherein said image pickup means is a CCD.

27. A signal processing apparatus according to claim 22, wherein said automatic gain control means includes:
   means for leveling the signal which was dot-sequenced by said dot-sequencing means; and
   means for controlling the level of said dot-sequenced signal which was leveled by said leveling means so as to become a predetermined level.

28. A signal processing apparatus comprising:
   (a) first control means for controlling such that a predetermined relation is obtained among levels of a plurality of color signals;
   (b) means for dot-sequencing the color signals which were level-controlled by said first control means;
   (c) means for respectively processing the plurality of color signals which are not level-controlled by said first control means; and
   (d) second control means for controlling the levels of said plurality of color signals which were processed by said processing means,
   wherein frequency characteristics of said first and second control means differ.

29. A signal processing apparatus according to claim 28, wherein said first control means has the frequency characteristic of a higher band than that of said second control means.

30. A signal processing apparatus according to claim 28, wherein said processing means includes a clamp circuit.

31. A signal processing apparatus according to claim 28, wherein said dot-sequencing means is for forming a luminance signal.

32. A signal processing apparatus according to claim 28, further comprising:
 (e) means for generating color difference signals from said plurality of color signals which were processed by said processing means; and
 (f) means for driving said first and second control means such that said color difference signals become predetermined levels.

33. An image pickup apparatus comprising:
 (a) image pickup means for converting an optical image to electrical information and for generating a plurality of color signals;
 (b) a first gain control means for controlling gains of at least a part of said plurality of color signals;
 (c) a second gain control means having different frequency characteristics from said first gain control means, for controlling gains of said at least a part of said plurality of color signals; and
 (d) dot-sequencing means for dot-sequencing said color signals to generate at least a part of a luminance signal.

34. An image pickup apparatus according to claim 33, wherein said image pickup means comprises means for separating said color signals from said electrical information.

35. An image pickup apparatus according to claim 34, wherein said separating means comprises a plurality of read out channels for reading out said electrical information.

36. An image pickup apparatus according to claim 33, wherein said image pickup means comprises a color separation filter and an image pickup surface for receiving the optical image through said color separation filter.

37. An image pickup apparatus according to claim 33, wherein said second gain control means has broader frequency characteristics than those of said first gain control means.

38. An image pickup apparatus according to claim 33, wherein said dot-sequencing means generates high-band luminance signal components.

39. An image pickup apparatus according to claim 33, further comprising a third gain control means for controlling a gain of said part of the luminance signal.

40. An image pickup apparatus according to claim 33, further comprising a nonlinear circuit for nonlinearly converting said part of the luminance signal.

41. An image pickup apparatus according to claim 33, further comprising means for generating a television signal using at least said part of the luminance signal and color signals controlled by said second gain control means.

* * * * *

UNITED STATES PATENT AND TRADEMARK OFFICE
CERTIFICATE OF CORRECTION

PATENT NO. : 4,814,861

DATED : March 21, 1989

INVENTOR(S) : Teruo Hieda

It is certified that error appears in the above-identified patent and that said Letters Patent is hereby corrected as shown below:

COLUMN 5:

Line 13, change "gamms" to --gamma--.

COLUMN 7:

Line 40, change "outputs" to --output--.

Line 64, change "S/N ratoio" to --S/N ratio--.

COLUMN 10:

Line 36, change "means;" to --means; and--.

COLUMN 11:

Line 15, change "automatically" to --automatic--.

Line 22, change "means means" to --means--.

UNITED STATES PATENT AND TRADEMARK OFFICE
CERTIFICATE OF CORRECTION

PATENT NO. : 4,814,861

DATED : March 21, 1989

INVENTOR(S) : Teruo Hieda

It is certified that error appears in the above-identified patent and that said Letters Patent is hereby corrected as shown below:

Col. 11, line 48, change "icaly" to --ically--.

Signed and Sealed this

Twenty-third Day of April, 1991

Attest:

HARRY F. MANBECK, JR.

*Attesting Officer*   *Commissioner of Patents and Trademarks*